United States Patent Office 3,469,010
Patented Sept. 23, 1969

3,469,010
INSECTICIDAL METHODS AND COMPOSITIONS UTILIZING KETONE ADDUCTS
Pasquale Lombardo, East Hanover Township, Morris County, N.J., assignor to Allied Chemical Corporation, New York, N.Y., a corporation of New York
No Drawing. Original application Mar. 19, 1963, Ser. No. 266,215. Divided and this application Dec. 15, 1966, Ser. No. 619,096
Int. Cl. A01n 9/02
U.S. Cl. 424—311                 10 Claims

ABSTRACT OF THE DISCLOSURE

Use of adducts of decachlorooctahydro-1,3,4-metheno-2H-cyclobuta (cd) pentalen-2-one and other ketones as insecticides.

---

This is a division of application Ser. No. 266,215, filed Mar. 19, 1963, now abandoned. The invention relates to new adducts prepared from the ketone, decachlorooctahydro-1,3,4-metheno-2H-cyclobuta (cd) pentalen-2-one, to new pesticidal compositions containing adducts of said ketone and to a method of combatting pests, especially insects, with these new pesticidal compositions.

Decahlorooctahydro-1,3,4-metheno-2H-cyclobuta (cd) pentalen-2-one, hereafter referred to as "polycyclic ketone," is a complex chlorinated polycyclic ketone having the molecular formula $C_{10}Cl_{10}O$ and a molecular weight of 490.68. It is believed to be most accurately represented by the following "cage" structural formula:

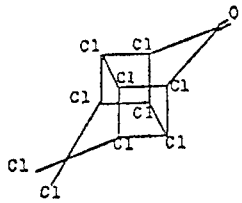

This polycyclic ketone may be prepared in known manner by hydrolyzing the reaction product of hexachlorocyclopentadiene and sulfur trioxide.

An object of the present invention is to provide new ketone adducts exhibiting high pesticidal activity.

Another object of the invention is to provide new pesticidal compositions containing the ketone adducts as active ingredients.

Still another object of the invention is to provide a method for combatting pests, especially insects, comprising contacting the pests with pesticidal compositions containing the ketone adducts as active ingredients.

It is a further object of the invention to provide a simple and economical method for preparing the ketone adducts.

Other objects and advantages of the invention will be apparent from the following description.

The ketone adducts contemplated by this invention comprise those obtained by reacting the polycyclic keton with a ketone having a general formula selected from the group consisting of (1) $RCH_2COR^1$ in which R is a member of the group consisting of hydrogen and methyl and $R^1$ is a member of the group consisting of alkyl, aryl and acyl radicals, (2)

in which $R^2$ is a member of the group consisting of hydrogen and alkyl radicals and (3)

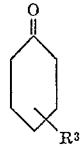

in which $R^3$ is a member of the group consisting of hydrogen and alkyl radicals.

In the compounds having the general formula $$RCH_2COR^1$$

the alkyl and aryl radicals represented by $R^1$ may be substituted or unsubstituted. The substituted alkyl radicals include, but are not limited to, arylalkyl, haloalkyl and carboalkoxyalkyl. The unsubstituted alkyl radicals preferably contain 1 to 9 carbon atoms, while the alkyl portion of the substituted alkyl radicals preferably contains 1 to 4 carbon atoms. The alkoxy portion of the carboalkoxyalkyl radicals also preferably contains 1 to 4 carbon atoms. Among the compounds in this category are 2-octanone, 2-nonanone, 2-heptanone, 2-undecanone, acetone, 4-methyl-2-pentanone, 3-pentanone, 2-butanone, 2-pentanone, diacetyl, chloroacetone phenylacetone, acetophenone, 3-methyl-2-butanone, ethyl levulinate, ethyl pyruvate, butyl levulinate, methyl pyruvate, etc.

In the compounds represented by the general formula

the alkyl radical preferably contains 1 to 3 carbon atoms. Compounds in this category include cyclopentanone, 2-methyl-cyclopentanone, 3-methylcyclopentanone, 4-methylcyclopentanone, etc.

In the group of compounds represented by the general formula

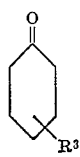

the alkyl radical preferably contains 1 to 3 carbon atoms. Compounds in this category include cyclohexanone, 2-methyl-cyclohexanone, 3-methylcyclohexanone, etc.

The ketone adducts of the invention may be prepared in simple and economical manner by reacting the polycyclic ketone with the desired ketone, in mol ratio of about 0.5 to 2 mols of polycyclic ketone per mol of ketone, at temperature ranging from room temperature to about 250° C.

If the ketone is available in hydrate form, it can be dehydrated before reaction by heating it in an oven at temperature of about 135° to 150° C. or by refluxing it with an aromatic solvent such as xylene to remove the water. The water can also be removed during reaction, as described below.

Although the reactants may be employed in mol ratio of about 0.5 to 2 mols of polycyclic ketone per mol of ketone, it is preferred to use approximately equimolar proportions of the reactants.

The reaction is carried out at room temperature to about 250° C., usually at room temperature of about 55° to 200° C. The reaction temperature is preferably the flux temperature of the reaction mixture.

If desired, the reaction may be carried out in the presence of an organic solvent. The solvent must be inert to the reactants and the desired ketone adduct. Among the suitable solvents are aliphatic or aromatic hydrocarbons such as xylene, toluene, benzene, petroleum ether, methylene chloride, etc. The solvent serves to keep the adduct in solution. Moreover, if the polycyclic ketone is empolyed in hydrate form, the solvent enables dehydration thereof during the reaction.

The ketone adducts may be recovered from the reaction mixture by procedures known in the art, as by precipitation with a non-solvent, e.g. hexane, followed by filtration and drying. Th adducts may be purified, for example, by recrystallization from hexane.

The following examples are typical of preparation of the ketone adducts of this invention. In the examples, parts are by weight.

Example 1

56 parts of polycyclic ketone hydrate (4 mols $H_2O$) were dissolved in 79 parts of acetone, filtered to remove a small amount of insoluble material and then distilled to a pot temperature of 85° C. Since acetone boils at 56° C., most of the unreacted acetone was removed. The remaining unreacted acetone was removed by stripping in vacuo. This procedure was repeated twice, resulting in production of 53 parts of solid polycyclic ketone-acetone adduct (96% yield).

The adduct melted at 342–348° C. with decomposition, and its infrared spectrum showed hydroxyl absorption at 2.78 microns and carbonyl absorption at 5.85 microns.

Example 2

56 parts of polycyclic ketone hydrate (4 mols $H_2O$), 15 parts of 4-methyl-2-pentanone and 260 parts of toluene were mixed and refluxed. The water formed was azeotroped out of the reaction mixture over a period of 20 hours. Solvent was removed by distillation in vacuo, leaving 50 parts of solid polycyclic ketone-4-methyl-2-pentanone adduct.

The adduct melted at 160–165° C., and its infrared spectrum showed hydroxyl absorption at 2.78 microns and carbonyl absorption at 5.86 microns.

Example 3

56 parts of polycyclic ketone hydrate (4 mols $H_2O$) were mixed with 215 parts of xylene, and the mixture was refluxed. The water formed was azeotroped out of the mixture over a period of 3 hours. 14.4 parts of ethyl levulinate were then added to the solution, and the mixture was refluxed for 18 hours. The solution was filtered and the filtrate stripped of solvent in vacuo to yield a viscous oil. Trituration of the oil with hexane gave 38 parts (60% yield) of solid polycyclic ketone-ethyl levulinate adduct.

The adduct had a melting point of 74–81° C., and its infrared spectrum showed hydroxyl absorption at 2.98 microns and carbonyl absorption at 5.80 and 5.88 microns.

Example 4

56 parts of polycyclic ketone (4 mols $H_2O$) were refluxed with 225 parts of xylene to azeotropically remove water. 17 parts of cyclopentanone were added to the xylene solution, and the mixture was refluxed overnight. The solution was then filtered to remove insoluble material and stripped to yield an oil. The oil was triturated with hexane to give 37 parts (64% yield) of solid polycyclic ketone-cyclopentanone adduct.

The adduct was recrystallized from hexanemethylene chloride mixture to produce a purified product having a melting point of 195–197° C. The infrared spectrum of the adduct showed hydroxyl absorption at 2.96 microns, carbon-hydrogen absorption at 3.34, 3.44, 6.88 and 7.12 microns and carbonyl absorption at 5.77 microns.

Example 5

Polycyclic ketone-2-octanone adduct was prepared by the procedure described in Example 4. In this run, the oily product was dissolved in 66 parts of hexane and cooled to −80° C. The resulting solid was filtered off and washed with hexane. 23 parts of adduct having a melting point of 76–78° C. were obtained. An additional 17 parts of adduct were obtained by refreezing the filtrate. The total crop represented a yield of 66%.

The infrared spectrum of the adduct showed hydroxyl absorption at 2.98 microns and carbonyl absorption at 5.91 microns.

Example 6

Polycyclic ketone-2-nonanone adduct was prepared by the procedure described in Example 5. 44 parts of solid adduct, constituting a yield of 70%, were obtained.

The adduct had a melting point of 70–76° C., and its infrared spectrum showed hydroxyl absorption at 2.96 microns and carbonyl absorption at 5.88 microns.

Example 7

Polycyclic ketone-2-heptanone adduct was prepared by the method described in Example 5. 27 parts of solid adduct were initially obtained, and an additional 11 parts of adduct were obtained by refreezing the filtrate. The total crop constituted a yield of 63%.

The adduct was recrystallized from hexanemethylene chloride mixture to produce a purified product melting at 85–86° C. The infrared spectrum of the adduct showed hydroxyl absorption at 2.95 microns, carbon-hydrogen absorption at 3.39, 3.47, 6.85, 7.01 and 7.15 microns and carbonyl absorption at 5.87 microns.

Example 8

Polycyclic ketone-2-undecanone adduct was prepared by the procedure described in Example 5. A total of 38 parts of solid adduct were obtained in two crops, representing a 50% yield.

The adduct had a melting point of 68–71° C., and its infrared spectrum showed hydroxyl absorption at 3.00 microns and carbonyl absorption at 5.90 microns.

Example 9

56 parts of polycyclic ketone hydrate (4 mols $H_2O$) were mixed with 82 parts of 3-pentanone. Insoluble material was filtered off, and the mixture was heated for two hours and then stripped in vacuo. 51 parts of solid polycyclic ketone-3-pentanone adduct were obtained.

The adduct had a melting point of 344–348° C. with decomposition, and its infrared spectrum showed hydroxyl absorption at 2.90 microns and carbonyl absorption at 6.00 microns.

Example 10

56 parts of polycyclic ketone hydrate (4 mols $H_2O$) were mixed with 81 parts of 2-butanone. The mixture was boiled down on a steam bath four times to obtain a product comprising solid polycyclic ketone-2-butanone adduct.

The adduct had a melting point of 346–350° C. with decomposition, and its infrared spectrum showed hydroxyl absorption at 2.90 microns and carbonyl absorption at 5.86 and 5.99 microns.

Example 11

56 parts of polycyclic ketone hydrate (4 mols $H_2O$) were mixed with 49 parts of 2-pentanone, and the mixture was heated at reflux for 4 hours. Excess 2-pentanone was stripped off. Additional 2-pentanone was added, and the mixture was heated to 135° C. and then stripped in vacuo. 51 parts of solid polycyclic ketone-2-pentanone adduct were obtained.

The adduct had a melting point of 84–160° C. and its infrared spectrum showed hydroxyl absorption at 2.90 microns and carbonyl absorption at 5.85 and 5.98 microns.

Example 12

56 parts of polycyclic ketone hydrate (4 mols $H_2O$) were mixed with 20 parts of cyclohexanone. 172 parts of xylene were added to the mixture, and the water formed was azeotroped out. The mixture was heated at 120° C. for several hours and then stripped in vacuo. An additional 20 parts of cyclohexanone and 43 parts of xylene were added, and the mixture was heated for 10 hours at 150° C. The mixture was then stripped in vacuo to a small volume. Partial crystallization occurred, and 20 parts of solid polycyclic ketone-cyclohexanone adduct were obtained.

The adduct had a melting point of 166–171° C., and its infrared spectrum showed hydroxyl absorption at 3.02 microns and carbonyl absorption at 5.88 microns.

Example 13

56 parts of polycyclic ketone hydrate (4 mols $H_2O$) were azeotroped free of water in xylene. 8.6 parts of diacetyl were then added, and the mixture was refluxed overnight. Solvent was stripped from the mixture in vacuo to yield a viscous solid. The solid was boiled up with hexane, filtered and washed with hexane. 42 parts of solid polycyclic ketone-diacetyl adduct were obtained.

The adduct had a melting point of 122–350° C. with decomposition, and its intrared spectrum showed hydroxyl absorption at 2.80 microns and carbonyl absorption at 5.65 and 5.75 microns.

Example 14

56 parts of polycyclic ketone hydrate (4 mols $H_2O$) were azeotroped free of water in 215 parts of xylene. 9.3 parts of chloroacetone were then added, and the mixture was refluxed overnight. Solvent was stripped from the mixture in vacuo, and the resultant solid was triturated with hexane and filtered off. An additional 10 parts of chloroacetone were added to the solid along with 172 parts of xylene. The hexane and water were distilled off, and the mixture was refluxed overnight. Solvent was stripped in vacuo, and the resultant solid was boiled up with hexane, filtered off and washed with hexane. 37 parts (64% yield) of solid polycyclic ketone-chloroacetone adduct were obtained.

The adduct had a melting point of 145–152° C., and its innfrared spectrum showed hydroxyl absorption at 2.80 microns and carbonyl absorption at 5.76 microns.

Example 15

56 parts of polycyclic ketone hydrate (4 mols $H_2O$) were azeotroped free of water in 215 parts of xylene. 13.5 parts of phenylacetone were added to the mixture, and it was refluxed for 60 hours. Solvent was stripped from the mixture in vacuo to yield an oil which solidified overnight. The solid was triturated with hexane, filtered off and washed with hexane. 42 parts (67% yield) of solid polycyclic ketone-phenylacetone adduct were obtained.

The adduct exhibited a melting point of 140–143° C., and its infrared spectrum showed hydroxyl absorption at 2.93 microns and carbonyl absorption at 5.87 microns.

Example 16

56 parts of polycyclic ketone hydrate (4 mols $H_2O$) were azeotroped free of water in 215 parts of xylene. 12 parts of acetophenone were added, and the mixture was refluxed overnight. The mixture was filtered and then stripped of solvent in vacuo to yield a solid. The solid was triturated with hexane, filtered off and washed with hexane. 51.5 parts (84% yield) of solid polycyclic ketone-acetophenone adduct were obtained.

The adduct was recrystallized from hexane-methylene chloride mixture to produce a purified product having a melting point of 152–153° C. The infrared spectrum of the adduct showed hydroxyl absorption at 2.95 microns, carbon-hydrogen absorption at 3.23 and 3.41 microns, carbonyl absorption at 5.98 microns and aromatic ring vibrations at 6.25, 6.31 and 6.89 microns.

Example 17

56 parts of polycyclic ketone hydrate (4 mols $H_2O$) were azeotroped free of water in 259 parts of xylene. 8.6 parts of 3-methyl-2-butanone were added, and the mixture was refluxed overnight. The solution was filtered and then stripped of solvent in vacuo. An oil resulted which solidified upon trituration with hexane. The solid was filtered off and washed with hexane. 36 parts (62% yield) of solid polycyclic ketone-3-methyl-2-butanone adduct were obtained.

The adduct exhibited a melting point of 139–143° C., and its infrared spectrum showed hydroxyl absorption at 3.01 microns and carbonyl absorption at 5.92 microns.

Example 18

56 parts of polycyclic ketone hydrate (4 mols $H_2O$) were azeotroped free of water in 215 parts of refluxing xylene. 13 parts of ethylacetoacetate were added, and the mixture was heated at 100° C. for 40 hours. The resulting mixture was filtered, and the filtrate was stripped of solvent in vacuo to yield 59 parts (95% yield) of a viscous, dark brown oil constituting polycyclic ketone-ethylacetoacetate adduct.

The infrared spectrum of the adduct showed hydroxyl absorption at 2.98 microns and carbonyl absorption at 5.80 and 5.88 microns.

Example 19

56 parts of polycyclic ketone hydrate (4 mols $H_2O$) were azeotroped free of water in 215 parts of refluxing xylene. 16 parts of tert.-butylacetoacetate were added, and the mixture was heated at 100–110° C. overnight. The mixture was then stripped of solvent in vacuo to produce 62 parts of a viscous, dark oil comprising polycyclic ketone-tert.-butylacetoacetate adduct.

The infrared spectrum of the adduct showed hydroxyl absorption at 2.93 microns and carbonyl absorption at 5.74 and 5.87 microns.

Example 20

49 parts of anhydrous polycyclic ketone and 12 parts of ethyl pyruvate were allowed to react in refluxing toluene over a period of 4½ days. Solvent was stripped from the mixture in vacuo to obtain a slightly oily solid. The solid was triturated with hexane, filtered off and washed with hexane to obtain 38 parts of air-dried solid comprising polycyclic ketone-ethyl pyruvate adduct. The adduct was recrystallized from 60 parts of chloroform to obtain 12 parts of purified adduct having a melting point of 240–247° C. Additional adduct was obtained by boiling down the filtrate and allowing it to crystallize.

The infrared spectrum of the adduct showed hydroxyl absorption at 2.92 microns and carbonyl absorption at 5.63 and 5.93 microns.

Example 21

49 parts of anhydrous polycyclic ketone were prepared by azeotropically distilling water out of ketone hydrate (4 mols $H_2O$) using toluene. 17.2 parts of butyl levulinate were added, and the mixture was refluxed overnight. Solvent was stripped in vacuo to yield an oily solid. The solid was triturated with hexane, filtered off and washed with hexane. The solid and filtrate were then combined. 176 parts of xylene were added, and solvent was removed to a pot temperature of 140° C. The resulting mass was then allowed to reflux for a few days. Solvent was then stripped from the mass in vacuo to obtain a dark oil. The oil was dissolved in a small amount of hot hexane and cooled. 45 parts (68% yield) of solid polycyclic ketone-butyl levulinate crystallized out.

The adduct exhibited a melting point of 94–96° C. after recrystallization from hexane-methylene chloride mixture. The infrared spectrum of the adduct showed hydroxyl absorption at 2.91 microns and carbonyl absorption at 5.77 and 5.87 microns.

Example 22

53 parts of polycyclic ketone hydrate (4 mols H₂O) were azeotroped free of water in 172 parts of refluxing xylene. 10 parts of methyl pyruvate were added, and the mixture was refluxed for 41 hours. Insoluble material was filtered off, and the filtrate was stripped of solvent in vacuo. A semi-solid was obtained which was triturated with hexane, cooled, filtered off and washed with hexane. 42 parts of solid polycyclic ketone-methyl pyruvate were obtained.

The adduct was recrystallized from chloroformmethylene chloride mixture to obtain a purified product having a melting point of 248–251° C. The infrared spectrum of the adduct showed hydroxyl absorption at 2.92 microns and carbonyl absorption at 5.62 and 5.92 microns.

The ketone adducts of this invention may be applied to pests, especially insects, "as is" but are advantageously incorporated as ingredients in suitable liquid or solid carriers to provide pesticidal spray or dust compositions.

The liquid pesticidal compositions generally contain in proportions by weight about 10 to 25% of the adduct as active ingredient, about 65 to 88% of an aromatic solvent and about 2 to 10% of a suitable wetting or emulsifying agent, such as diglycol oleate, p-isooctyl phenyl ether of polyethylene glycol, blends of alkyl aryl polyether alcohols with alkyl aryl sulfonates and blends of polyoxyethylene sorbitan esters of mixed fatty and resin acids with alkyl aryl sulfonates. The resulting concentrate solution is diluted or admixed with water to form an aqueous dispersion or emulsion suitable for spray application containing about 0.001 to 0.1% by weight of active ingredient.

Representative aromatic solvents which may be used in preparing the liquid pesticidal compositions include xylene, high aromatic solvents, methylated naphthalenes, heavy aromatic naphtha, etc. It is an advantage of this invention that the adducts have substantially greater solubility in aromatic solvents than the polycyclic ketone per se.

The wettable powder compositions generally contain in proportions by weight about 25 to 75% of the active ingredient, about 20 to 73% of a finely divided solid carrier and about 2 to 5% of suitable wetting and dispersing agents. Typical wetting agents include polyether sulfonates, alkyl aryl sulfonates, etc. Typical dispersing agents include ligninsulfonates, naphthalene sulfonic acid-formaldehyde condensates, etc.

The wettable powder compositions can readily be prepared by mixing or milling the active ingredient with the carrier and wetting agent to a typical particle size of from about 3 to 40 microns. The composition is admixed with water to form an aqueous dispersion suitable for spraying containing about 0.001 to 0.1% by weight of active ingredient.

Representative solid carriers which may be used in preparing the wettable powders include magnesium and aluminum silicates (talc, kaolin clays, attapulgite clays, etc.), carbonates (dolomite, chalk, etc.), materials containing silicic acid (diatomaceous earth), fuller's earth, gypsum, sulfur, etc.

The dosage of the active ingredient depends on the particular organisms to be controlled, field conditions, etc., as known in the art. In any event, sufficient quantity of the active ingredient is used to provide the desired toxicity.

Exemplary tests of the ketone adducts of the present invention are set forth below:

| | | Percent Kill | |
|---|---|---|---|
| Active Ingredient | Formulator | Mexican Bean Beetle Larvae | Southern Armyworms |
| Polycyclic ketone-cyclopentanone adduct | 2 pounds active ingredient per 100 gallons water | 100 | 100 |
| Polycyclic ketone-2-octanone adduct | do | | 100 |
| Polycyclic ketone-2-nonanone adduct | do | | 0 |
| Polycyclic ketone-2-heptanone adduct | do | | 00 |
| Polycyclic ketone-acetone adduct | do | 100 | 00 |
| Polycyclic ketone-4-methyl-2-pentaone adduct | do | 100 | 100 |
| Polycyclic ketone-3-pentanone adduct | do | 100 | 100 |
| Polycyclic ketone-2-butanone adduct | do | 100 | 100 |
| Polycyclic ketone-2-pentanone adduct | do | 100 | 100 |
| Polycyclic ketone-cyclohexanone adduct | do | 100 | 100 |
| Polycyclic ketone-diacetyl adduct | 8 pounds wettable powder composition [1] per 100 gallons water | | 100 |
| Polycyclic ketone-chloroacetone adduct | do.[1] | | 100 |
| Polycyclic ketone-phenylacetone adduct | do.[1] | | 30 |
| Polycyclic ketone-acetophenone adduct | do.[1] | | 100 |
| Polycyclic ketone-3-methyl-2-butanone adduct | do.[1] | | 100 |
| Polycyclic ketone-ethyl levulinate adduct | 2 pounds active ingredient per 100 gallons water | 100 | 100 |
| Polycyclic ketone-ethylacetoacetate adduct | do | 100 | 100 |
| Polycyclic ketone-tert.-butylacetoacetate adduct | 8 pounds wettable powder composition [1] per 100 gallons water | 100 | 100 |
| Polycyclic ketone-ethyl pyruvate adduct | 2 pounds active ingredient per 100 gallons acetone-water solution (1:1) | | 100 |
| Polycyclic ketone-butyl levulinate adduct | do | 100 | 100 |
| Polycyclic ketone-methyl pyruvate adduct | do | 80 | 90 |

[1] 25.0% active ingredient, 73.5% "Attaclay" (attapulgite clay carrier), 0.75% "Elvanol" 51–05 (water-soluble synthetic polyvinyl alcohol dispersing agent), 0.75% "Nacconol SW" (alkyl aryl sulfonate wetting agent).

The tests on toxicity to Mexican bean beetle larvae (*Epilachna varivestis*) were carried out by spraying horticultural (cranberry) bean plants with the indicated formulation and allowing the plants to dry. The larvae were confined to the treated foliage by means of wire cages. Record of kill was made 3 days after treatment.

The tests on Southern armyworms (*Prodenia eridania*) were carried out by spraying horticultural (cranberry) bean plants with the indicated formulation and allowing the plants to dry. The armyworms were confined to the treated foliage by means of wire cages. Mortality count was made three days after treatment.

I claim:
1. An insecticidal composition comprising an insecticidally effective amount of an adduct prepared by reaction of decachlorooctahydro-1,3,4-metheno-2H-cyclobuta (cd) pentalen-2-one and a compound having a formula selected from the group consisting of
  (1) $RCH_2COR^1$ in which R is a member of the group consisting of hydrogen and methyl and $R^1$ is a member of the group consisting of unsubstituted alkyl containing 1 to 9 carbon atoms, aryalkyl in which the alkyl contains 1 to 4 carbon atoms, haloalkyl in which the alkyl contains 1 to 4 carbon atoms, carboalkoxyalkyl in which the alkyl contains 1 to 4 carbon atoms and the alkoxy contains 1 to 4 carbon atoms, carboalkoxy in which the alkoxy contains 1 to 2 carbon atoms, phenyl and acetyl, (2)

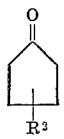

in which R² is a member of the group consisting of hydrogen and alkyl containing 1 to 3 carbon atoms and (3)

in which R³ is a member of the group consisting of hydrogen and alkyl containing 1 to 3 carbon atoms, in mol ratio of about 0.5 to 2 mols of decachlorooctahydro-1,3,4-metheno-2H-cyclobuta (cd) pentalen-2-one per mol of compound, at temperatures ranging from room temperature to about 250° C., together with a liquid or solid insecticidal carrier therefor.

2. An insecticidal composition comprising an insecticidally effective amount of an adduct prepared by reaction of decachlorooctahydro-1,3,4-metheno-2H-cyclobuta (cd) pentalen-2-one and a compound having the formula RCH₂COR¹ in which R is a member of the group consisting of hydrogen and methyl and R¹ is a member of the group consisting of unsubstituted alkyl containing 1 to 9 carbon atoms, arylalkyl in which the alkyl contains 1 to 4 carbon atoms, haloalkyl in which the alkyl contains 1 to 4 carbon atoms, carboalkoxyalkyl in which the alkyl contains 1 to 4 carbon atoms and the alkoxy contains 1 to 4 carbon atoms, carboalkoxy in which the alkoxy contains 1 to 2 carbon atoms, phenyl and acetyl, in mol ratio of about 0.5 to 2 mols of decachlorooctahydro-1,3,4-metheno-2H-cyclobuta (cd) pentalen-2-one per mole of compound, at temperature ranging from room temperature to about 250° C., together with a liquid or solid insecticidal carrier therefor.

3. An insecticidal composition comprising an insecticidally effective amount of an adduct prepared by reaction of decachlorooctahydro-1,3,4-metheno-2H-cyclobuta (cd) pentalen-2-one and a compound having the formula

in which R² is a member of the group consisting of hydrogen and alkyl containing 1 to 3 carbon atoms, in mol ratio of about 0.5 to 2 mols of decachlorooctahydro-1,3, 4-metheno-2H-cyclobuta (cd) pentalen-2-one per mol of compound, at temperature ranging from room temperature to about 250° C., together with a liquid or solid insecticidal carrier therefor.

4. An insecticidal composition comprising an insecticidally effective amount of an adduct prepared by reaction of decachlorooctahydro-1,3,4-metheno-2H-cyclobuta (cd) pentalen-2-one and a compound having the formula

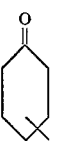

in which R³ is a member of the group consisting of hydrogen and alkyl containing 1 to 3 carbon atoms, in mol ratio of about 0.5 to 2 mols of decachlorooctahydro-1,3, 4-metheno-2H-cyclobuta (cd) pentalen-2-one per mol of compound, at temperature ranging from room temperature to about 250° C. together with a liquid or solid insecticidal carrier therefor.

5. A process for combatting insects which comprises subjecting the insects to the action of an insecticidally effective amount of an adduct prepared by reaction of decachloroctohydro-1,3,4-metheno - 2H - cyclobuta (cd) pentalen-2-one and a compound having a formula consisting of (1) RCH₂COR¹ in which R is a member of the group consisting of hydrogen and methyl and R¹ is a member of the group consisting of unsubstituted alkyl containing 1 to 9 carbon atoms, arylalkyl in which the alkyl contains 1 to 4 carbon atoms, haloalkyl in which the alkyl contains 1 to 4 carbon atoms, carboalkoxyalkyl in which the alkyl contains 1 to 4 carbon atoms and the alkoxy contains 1 to 4 carbon atoms, carboalkoxy in which the alkoxy contains 1 to 2 carbon atoms, phenyl and acetyl, (2)

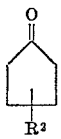

in which R² is a member of the group consisting of hydrogen and alkyl containing 1 to 3 carbon atoms and (3)

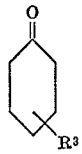

in which R³ is a member of the group consisting of hydrogen and alkyl containing 1 to 3 carbon atoms, in mol ratio of about 0.5 to 2 mols of decachlorooctahydro-1,3,4-metheno - 2H - cyclobuta (cd) pentalen-2-one per mol of compound, at temperature ranging from room temperature to about 250° C.

6. A process for combatting insects which comprises subjecting the insects to the action of an insecticidally effective amount of an adduct prepared by reaction of decachlorooctahydro-1,3,4-metheno - 2H - cyclobuta (cd) pentalen-2-one and a compound having the formula RCH₂COR¹ in which R is a member of the group consisting of hydrogen and methyl and R¹ is a member of the group consisting of unsubstituted alkyl containing 1 to 9 carbon atoms, arylalkyl in which the alkyl contains 1 to 4 carbon atoms, haloalkyl in which the alkyl contains 1 to 4 carbon atoms, carboalkoxyalkyl in which the alkyl contains 1 to 4 carbon atoms and the alkoxy contains 1 to 4 carbon atoms, carboalkoxy in which the alkoxy contains 1 to 2 carbon atoms, phenyl and acetyl, in mol ratio of about 0.5 to 2 mols of decachloroctahydro-1,3,4-metheno-2H-cyclobuta (cd) pentalen-2-one per mol of compound, at temperature ranging from room temperature to about 250° C.

7. A process for combatting insects which comprises subjecting the insects to the action of an insecticidally effective amount of an adduct prepared by reaction of decachlorooctahydro-1,3,4-metheno - 2H - cyclobuta (cd) pentalen-2-one and a compound having the formula

in which R² is a member of the group consisting of hydrogen and alkyl containing 1 to 3 carbon atoms, in mol ratio of about 0.5 to 2 mols of decachlorooctahydro-1,3,4-metheno-2H-cyclobuta (cd) pentalen-2-one per mol of compound, at temperature ranging from room temperature to about 250° C.

8. A process for combatting insects which comprises subjecting the insects to the action of an insecticidally effective amount of an adduct prepared by reaction of decachlorooctahydro-1,3,4-metheno - 2H - cyclobuta (cd) pentalen-2-one and a compound having the formula

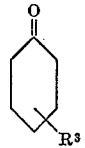

in which $R^3$ is a member of the group consisting of hydrogen and alkyl containing 1 to 3 carbon atoms, in mol ratio of about 0.5 to 2 mols of decachlorooctahydro-1,3,4-metheno-2H-cyclobuta (cd) pentalen-2-one per mole of compound, at temperature ranging from room temperature to about 250° C.

9. A composition according to claim 4 wherein the adduct prepared by reaction of decachlorooctahydro-1,3,4-metheno-2H-cyclobuta (cd) pentalen-2-one and ethyl levulinate is employed.

10. A process according to claim 6 wherein the adduct prepared by reaction of decachlorooctahydro-1,3,4-metheno-2H-cyclobuta (cd) pentalen-2-one and ethyl levulinate is employed.

References Cited

UNITED STATES PATENTS 3,096,239   7/1963   Hoch et al. _____ 167—30
3,341,406   9/1967   Gilbert et al. _____ 167—30

ALBERT T. MEYERS, Primary Examiner

V. D. TURNER, Assistant Examiner

U.S. Cl. X.R.

424—331

PO-1050
(5/69)

UNITED STATES PATENT OFFICE
CERTIFICATE OF CORRECTION

Patent No. 3,469,010        Dated September 23, 1969

Inventor(s) Pasquale Lombardo

It is certified that error appears in the above-identified patent and that said Letters Patent are hereby corrected as shown below:

Column 1, line 60, "keton" should read -- ketone --. Column 2, line 69, "room" should be deleted. Column 2, line 70, "flux" should read -- reflux --. Column 5, line 26, "intrared" should read -- infrared --. Column 5, line 44, "innfrared" should read -- infrared --. Column 7, line 11, "chloroformmethyl-" should read -- chloroform methyl- --. Column 7, in the Table, heading "Formulator" should read -- Formulation --. Column 12, line 3, the claim reference numeral "4" should read -- 2 --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents